US011790596B2

(12) United States Patent
Abramov

(10) Patent No.: US 11,790,596 B2
(45) Date of Patent: *Oct. 17, 2023

(54) BAYESIAN MACHINE LEARNING SYSTEM FOR ADAPTIVE RAY-TRACING

(71) Applicant: NVIDIA Corporation, Santa Clara, CA (US)

(72) Inventor: Juri Abramov, Ringenwalde (DE)

(73) Assignee: NVIDIA Corporation, Santa Clara, CA (US)

(*) Notice: Subject to any disclaimer, the term of this patent is extended or adjusted under 35 U.S.C. 154(b) by 10 days.

This patent is subject to a terminal disclaimer.

(21) Appl. No.: 17/647,322

(22) Filed: Jan. 6, 2022

(65) Prior Publication Data

US 2022/0130101 A1 Apr. 28, 2022

Related U.S. Application Data

(63) Continuation of application No. 16/869,112, filed on May 7, 2020, now Pat. No. 11,250,613.

(Continued)

(51) Int. Cl.
*G06T 15/06* (2011.01)
*G06N 3/08* (2023.01)
(Continued)

(52) U.S. Cl.
CPC ............ *G06T 15/06* (2013.01); *G06N 3/047* (2023.01); *G06N 3/08* (2013.01); *G06T 5/50* (2013.01);
(Continued)

(58) Field of Classification Search
CPC .......... G06T 15/00; G06T 15/80; G06T 15/06; G06T 15/005; G06T 15/50; G06T 15/506;
(Continued)

(56) References Cited

U.S. PATENT DOCUMENTS 10,983,233 B2 4/2021 Maucec et al.
11,250,613 B2 * 2/2022 Abramov ............... G06N 3/047
(Continued)

OTHER PUBLICATIONS

International Search Report and Written Opinion received for PCT Application No. PCT /US2020/031912, dated Jul. 14, 2020, 13 pages.
(Continued)

*Primary Examiner* — Todd Buttram
(74) *Attorney, Agent, or Firm* — Shook, Hardy & Bacon L.L.P.

(57) ABSTRACT

Various techniques for adaptive rendering of images with noise reduction are described. More specifically, the present disclosure relates to approaches for rendering and denoising images—such as ray-traced images—in an iterative process that distributes computational efforts to pixels where denoised output is predicted with higher uncertainty. In some embodiments, an input image may be fed into a deep neural network (DNN) to jointly predict a denoised image and an uncertainty map. The uncertainty map may be used to create a distribution of additional samples (e.g., for one or more samples per pixel on average), and the additional samples may be used with the input image to adaptively render a higher quality image. This process may be repeated in a loop, until some criterion is satisfied, for example, when the denoised image converges to a designated quality, a time or sampling budget is satisfied, or otherwise.

23 Claims, 8 Drawing Sheets

Related U.S. Application Data

(60) Provisional application No. 62/856,644, filed on Jun. 3, 2019.

(51) Int. Cl.
  *G06T 5/50* (2006.01)
  *G06N 3/04* (2023.01)
  *G06N 3/047* (2023.01)

(52) U.S. Cl.
  CPC .............. *G06T 2207/20081* (2013.01); *G06T 2207/20084* (2013.01)

(58) Field of Classification Search
  CPC ......... G06T 15/08; G06T 15/04; G06T 15/60; G06T 2200/04; G06T 2210/36; G06T 5/002
  See application file for complete search history.

(56) References Cited

U.S. PATENT DOCUMENTS

| | | | |
|---|---|---|---|
| 2010/0174514 A1* | 7/2010 | Melkumyan | G06F 17/18 703/2 |
| 2015/0078661 A1* | 3/2015 | Granados | G06T 5/50 382/167 |
| 2016/0140725 A1* | 5/2016 | Bergner | G06T 7/149 382/173 |
| 2017/0139065 A1 | 5/2017 | Gentilhomme | |
| 2019/0354810 A1* | 11/2019 | Samel | G06F 18/231 |
| 2020/0125877 A1 | 4/2020 | Phan et al. | |
| 2020/0211253 A1* | 7/2020 | Liktor | G06T 15/005 |
| 2020/0380763 A1* | 12/2020 | Abramov | G06T 5/50 |
| 2022/0130101 A1* | 4/2022 | Abramov | G06N 3/08 |

OTHER PUBLICATIONS

International Preliminary Report on Patentability received for PCT Patent Application No. PCT/US2020/031912, dated Dec. 16, 2021, 11 pages.

Bako, S., et al., "Kernel-Predicting Convolutional Networks for Denoising Monte Carlo Renderings", ACM Transactions on Graphics, vol. 36, No. 4, Article 97, pp. 1-14 (Jul. 2017).

Boughida, M., and Boubekeur, T., "Bayesian Collaborative Denoising for Monte Carlo Rendering", Computer Graphics Forum, Eurographics Symposium on Rendering, vol. 36, No. 4, pp. 137-153 (2017).

Chaitanya, C. R. A., et al., "Interactive Reconstruction of Monte Carlo Image Sequences using a Recurrent Denoising Autoencoder", ACM Transactions on Graphics, vol. 36, No. 4, Article 98, pp. 1-12 (Jul. 2017).

Dong, L., et al., "To Exploit Uncertainty Masking for Adaptive Image Rendering", In IEEE International Symposium on Circuits and Systems (ISCAS), pp. 2848-2851 (2013).

Hachisuka, T., et al., "Multidimensional Adaptive Sampling and Reconstruction for Ray Tracing", In ACM SIGGRAPH papers, pp. 1-10 (2008).

Hasselgren, J., et al., "Neural Temporal Adaptive Sampling and Denoising", Computer Graphics Forum, Proceedings of Eurographics, pp. 1-9 (2020).

Kar, A., and Biswas, P. K., "Fast Bayesian Uncertainty Estimation of Batch Normalized Single Image Super-Resolution Network", arXiv:1903.09410v1, pp. 1-10 (Mar. 22, 2019).

Kendall, A., and Gal, Y., "What Uncertainties Do We Need in Bayesian Deep Learning for Computer Vision?", In Advances in Conference on Neural Information Processing Systems (NIPS), pp. 1-11 (2017).

Kuznetsov, A., et al., "Deep Adaptive Sampling for Low Sample Count Rendering", Computer Graphics Forum, Eurographics Symposium on Rendering, vol. 37, No. 4, pp. 1-10 (2018).

Zhang, Z., et al., "Reducing Uncertainty in Undersampled MRI Reconstruction with Active Acquisition", In Proceedings of the IEEE Conference on Computer Vision and Pattern Recognition, pp. 2049-2058 (2019).

\* cited by examiner

BAYESIAN MACHINE LEARNING SYSTEM FOR ADAPTIVE RAY-TRACING

CROSS-REFERENCE TO RELATED APPLICATIONS

This application is a continuation of U.S. patent application Ser. No. 16/869,112, filed May 7, 2020 which claims the benefit of U.S. Provisional Application No. 62/856,644, filed on Jun. 3, 2019. Each of these applications is incorporated herein by reference in its entirety.

BACKGROUND

Ray-tracing is a technique used to render images by tracing a path of light in a virtual environment and simulating the effects of the light's encounters with virtual objects. Various applications of ray-tracing technology may simulate a variety of optical effects—such as shadows, reflections and refractions, scattering phenomenon, ambient occlusions, global illuminations, and dispersion phenomenon (such as chromatic aberration). Ray-tracing typically involves generating ray-traced samples by casting rays in a virtual environment to sample lighting conditions for pixels of a frame. The ray-traced samples may be combined and used to determine pixel colors for an image. To conserve computing resources, the lighting conditions may be sparsely sampled, resulting in a noisy render. The noisy render may then be filtered to reduce noise and produce a final render that approximates a render of a fully-sampled scene.

In order for the final render to accurately portray lighting conditions in the virtual environment after filtering, conventional approaches require a large number of ray-traced samples (e.g., hundreds of samples or more) for each pixel. Due to the large number of samples, the computational resources used for rendering the virtual environment are often significant and often impose a significant delay to produce a suitable output quality. In practice, designers are often challenged to produce high quality images using a limited budget of samples. To address this challenge, some prior techniques adaptively distribute samples across different pixels, rather than uniformly distributing the samples. The goal of such adaptive sampling is to avoid wasting sampling budget on areas of an image that do not need as many samples. However, conventional techniques are limited in the accuracy with which they allocate samples to areas of an image. As a result, conventional techniques often use limited computational resources in an inefficient manner, unnecessarily generating extraneous samples in areas that do not need them. As such, there is a need for a more effective way to distribute samples during adaptive sampling

SUMMARY

Embodiments of the present disclosure relate to adaptive rendering of images with noise reduction. More specifically, the present disclosure relates to approaches for rendering and denoising images—such as ray-traced images—in an iterative process that distributes computational efforts to pixels where denoised output is predicted with higher uncertainty. In some embodiments, an input image may be fed into a deep neural network (DNN) to jointly predict a denoised image and an uncertainty map. The uncertainty map may be used to create a distribution of additional samples (e.g., for one or more samples per pixel on average), and the additional samples may be used to adaptively render a higher quality image. This process may be repeated in a loop, until some completion criterion is satisfied, for example, when the denoised image converges to a designated quality, a time or sampling budget is satisfied, or otherwise. Compared to prior techniques, techniques described herein may improve the efficiency with which samples are distributed to areas of an image that need refinement, resulting in faster convergence time, saving computational resources, and/or significantly accelerating the rendering process.

BRIEF DESCRIPTION OF THE DRAWINGS

The present systems and methods for adaptive rendering of images with noise reduction are described in detail below with reference to the attached drawing figures, wherein.

DETAILED DESCRIPTION

Figure 1:
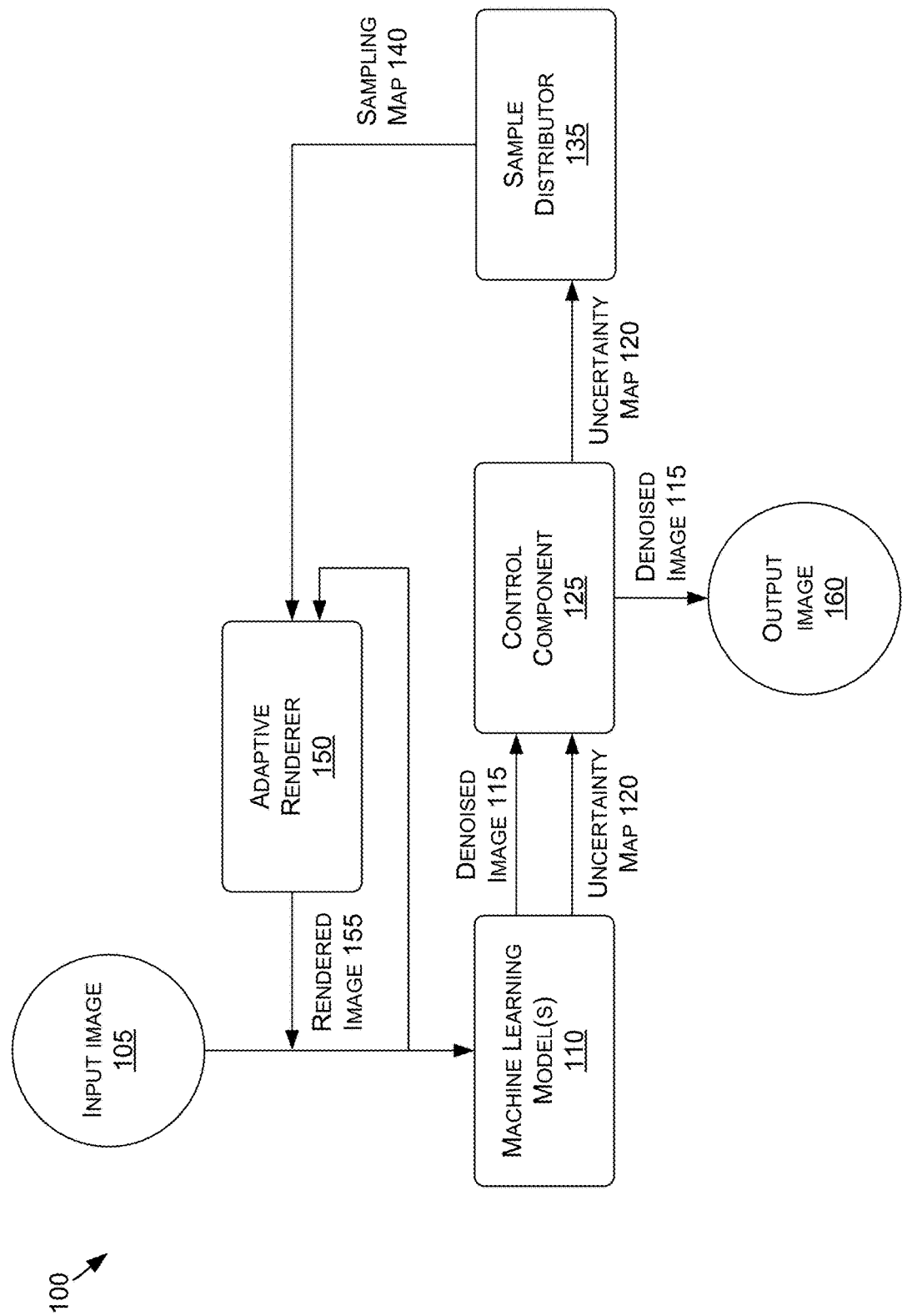
FIG. 1 is an example system diagram of an adaptive rendering and denoising system, in accordance with some embodiments of the present disclosure.

Systems and methods are disclosed related to adaptive rendering of images with noise reduction. More specifically, the present disclosure relates to approaches for rendering and denoising images—such as ray-traced images—in an iterative process that distributes computational efforts to pixels where denoised output is predicted with higher uncertainty. In some embodiments, an input image may be fed into a deep neural network (DNN) to jointly predict a denoised image and an uncertainty map. The uncertainty map may be used to create a distribution of additional samples (e.g., for one or more samples per pixel on average), and the additional samples may be used with the input image to adaptively render a higher quality image. This process may be repeated in a loop, until some criterion is satisfied, for example, when the denoised image converges to a designated quality, a time or sampling budget is satisfied, or otherwise.

At a high level, a Neural Network (NN) may be used to jointly generate a denoised image and an uncertainty map from an input image and/or other input data. In a simple example architecture, the NN may accept a three channel input image and predict a three channel denoised image and a one or three channel uncertainty map.

Additionally or alternatively, the NN may accept other (e.g., per-pixel) input features, which may be stacked into multiple channels of an input tensor or other suitable representation. Thus, each input pixel may have any number of associated values, such as values for color (e.g., single channel, separate channels for Red Green Blue (RGB)), ray-traced sample values, ray-traced sample counts, and/or ray-traced sample averages, hit distance, visibility, normals, texture, albedo, specularity, and/or others. In some embodiments, the NN may additionally include input channel(s) that accept a denoised image (e.g. one or three channels) and/or uncertainty map (e.g., one or three channels) from a prior loop iteration, for example, using some initialized baseline values for a first iteration and/or an input signal that indicates whether to use the data).

The NN may use any or all of these input(s) to jointly predict a denoised image and an uncertainty map. For example, an output layer of the NN may contain three channels for RGB values of the denoised image, and the same or some other output layer may contain one or three channels for predicted uncertainty values. Examples of uncertainty values include denoised image deviation (e.g., standard or mean absolute), logarithm of denoised image deviation, denoised image variance, logarithm of denoised image variance (log variance), and/or otherwise.

For example, for each pixel of a predicted denoised image, a predictive distribution may be approximated, the expected value of the approximation may be used as the value for the pixel in the denoised image, and an uncertainty value such as deviation (e.g., standard or mean absolute) or variance of the approximation may be used as the value in the uncertainty map. Thus, predicted uncertainty values may be used to populate an uncertainty map quantifying predictive uncertainty of the output image, with dimensions that correspond to the output image. In embodiments where the uncertainty map has three channels, uncertainty may be predicted on a per pixel basis separately for each RGB channel (or a different number of channels for a different color format). In embodiments where the uncertainty map has one channel, uncertainty may be predicted on a per pixel basis by averaging uncertainty values computed based on separate RGB predictions, based on averaged predictions for RGB values, or otherwise aggregating the data.

Generally, the NN may use any suitable architecture. For example, the NN may be implemented using encoder and decoder components with skip connections. Example architectures may include an autoencoder such as the U-Net autoencoder used in NVIDIA's OptiX/IRAY denoiser, a Feature Pyramid Network, Generative Adversarial Network (GAN), and/or another type of neural network or machine learning model. In some embodiments, the NN may include a Bayesian Neural Network (BNN).

Generally, a BNN may be similar to a standard NN, but network weights are assigned probability distributions rather than point estimates. Bayesian approaches may predict certainty of results in addition to predicting results themselves. For example, a BNN may generate a predictive distribution by predicting a mean of the predictive distribution as well as uncertainty such as variation or deviation of the predictive distribution. In some embodiments, a single BNN may include a common trunk (or stream of layers) with different heads (or at least partially discrete streams of layers) that predict the mean and the uncertainty. Generally, a BNN may be trained using variational inference to model these distributions, and the BNN may be evaluated using Maximum A Posteriori (MAP) estimates (e.g., of the mean) of the variational posterior distributions.

In operation, the NN may be used in an iterative process that predicts successive higher quality images until one or more completion criteria are met. Initially, a baseline image may be accessed or generated as an input image of the NN. In some embodiments, a baseline image may be rendered with uniformly distributed samples (e.g., one sample per pixel) across the image. The baseline image may be fed into the DNN, which jointly predicts a denoised image and an uncertainty map. Generally, the uncertainty map may be used to identify which pixels would likely benefit from one or more additional samples, so the uncertainty map may be used to allocate additional samples to pixels with higher uncertainty.

In some embodiments, the predicted uncertainty map may be used to distribute additional samples per pixel on average into a sampling map. For example, given a particular sampling budget (e.g., 10 samples/pixel on average), the sampling budget may be distributed across all pixels to reduce uncertainty. Any known distribution technique may be applied, such as variation or deviation reduction techniques. By way of non-limiting example, a sampling distribution may be computed per pixel as $\alpha s^2/n$, where $\alpha$ is a constant, s is $e^o$ (which may be taken or derived from the uncertainty map), and n is the number of samples already taken for the pixel. The sampling distribution may be scaled and/or rounded to allocate the sampling budget into a sampling map, for example, of integer values indicating a number of additional samples per pixel, such that the sum of the integer values is less than or equal to the sampling budget. The sampling map may be used to identify which pixels to sample, and how many times. The identified samples may be rendered, the total number of samples per pixel (or sum of the values of the samples per pixel) may be updated, and the additional samples may be averaged into the baseline image to adaptively render a higher quality image. The resulting rendered image may be fed into the NN, and the process may be repeated in a loop to render successively higher quality images.

Generally, the loop may be iterated, predicting successive higher quality denoised images, until one or more completion criteria are satisfied. Any suitable criteria may be used. In some embodiments, a time budget (e.g., 1 hr, 10 hrs, etc.) and/or sampling budget (1000 samples/pixel average) may be applied, and the loop may run until the budget runs out (e.g., the next loop iteration may only be triggered when there is sufficient time and/or sampling budget remaining). Additionally or alternatively, structural similarity between predicted denoised images and/or adaptively rendered images from successive loop iterations may be compared (e.g., by a neural network trained to predict structural similarity and/or an algorithm), and the loop may cut off when structural similarity is above some threshold such as 99% (e.g., indicating another loop iteration may not predict substantially better image quality). In yet another example, uncertainty values from a predicted uncertainty map may be combined to form some measure of composite uncertainty (e.g., sum of squares of mean variation per pixel) and compared with some threshold, and the loop may cut off when the composite uncertainty for a denoised image is below the threshold. In yet another example, the loop may cut off based on a user input or other signal requesting to stop the loop. In some embodiments, a delay may be injected between successive loop iterations to avoid running the loop too frequently and/or consuming too many resources. In some embodiments, one or more completion criteria may be evaluated after each feedforward pass through the NN, and when a completion criterion has been met, the predicted denoised image from the NN may be used as the output image or frame. These are just a few examples, and other types of completion criteria may additionally or alternatively be applied.

The adaptive rendering and denoising techniques described herein may be applied in ray tracing applications such as computer graphics, animation, augmented and virtual reality, movie production, architecture and engineering design, lighting design, and other applications, whether in real-time (e.g., video games) or non-real-time (e.g., film and television). Compared to prior techniques, the techniques described herein may improve the efficiency with which samples are distributed to areas of an image that need refinement, resulting in faster convergence time, saving computational resources, and/or significantly accelerating the rendering process.

With reference to FIG. 1, FIG. 1 is an example system diagram of an adaptive rendering and denoising system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the adaptive rendering and denoising system 100 may be implemented on one or more instances of the computing device 800 of FIG. 8.

The adaptive rendering and denoising system 100 may include, among other things, a machine learning model(s) 110, a control component 125, a sample distributor 135, and an adaptive renderer 150. Generally, the components of the adaptive rendering and denoising system 100 may operate in a loop until one or more completion criteria are satisfied. For example, in a first loop iteration, the machine learning model(s) 110 may jointly (or independently in some embodiments) generate a denoised image 115 and an uncertainty map 120 from an input image 105. In some embodiments, the control component 125 may then evaluate the output of the machine learning model(s) against one or more completion criteria. When the one or more completion criteria are determined to be satisfied, the control component 125 may terminate the loop and output the denoised image 115 as the output image 160. Otherwise, the control component 125 may pass the uncertainty map 120 to the sample distributor 135, which may use the uncertainty map 120 to distribute additional samples per pixel on average into a sampling map 140. The adaptive renderer 150 may render the additional samples identified by the sampling map 140 (using ray tracing), and average or otherwise incorporate the additional samples into the input image 105 to adaptively render a higher quality image (e.g., a rendered image 155). The rendered image 155 may be fed into the machine learning model(s) 110 for a subsequent pass through the loop. Generally, the adaptive renderer 150 may use a sampling map 140 from one loop iteration to identify which additional samples to render, and may average those additional samples into the rendered image 155 from a prior loop iteration to render successively higher quality images.

The machine learning model(s) 110 may jointly generate a denoised image 115 and an uncertainty map 120 from an input image (e.g., the input image 105 for a first loop iteration, a rendered image 155 for subsequent iterations) and/or other input data. In a simple example architecture, the machine learning model(s) 110 may accept a three channel input image and predict a three channel denoised image 115 and a one or three channel uncertainty map 120.

Additionally or alternatively, the machine learning model(s) 110 may accept other (e.g., per-pixel) input features, which may be stacked into multiple channels of an input tensor or other suitable representation. Thus, each input pixel may have any number of associated values, such as values for color (e.g., single channel, separate channels for Red Green Blue (RGB)), ray-traced sample values, hit distance, visibility, normals, texture, albedo, specularity, and/or others. In some embodiments, the machine learning model(s) 110 may additionally include input channel(s) that accept a predicted denoised image (e.g. one or three channels) and/or uncertainty map (e.g., one or three channels) from a prior loop iteration, for example, using some initialized baseline values for a first iteration and/or an input signal that indicates whether to use the data. The machine learning model(s) 110 may use these input(s) to jointly predict a denoised image 115 and an uncertainty map 120. For example, an output layer of the machine learning model(s) 110 may contain three channels for RGB values of the denoised image 115, and the same or some other output layer may contain one or three channels for the uncertainty map 120. Examples of uncertainty values include denoised image deviation (e.g., standard or mean absolute), logarithm of denoised image deviation, denoised image variance, logarithm of denoised image variance (log variance), and/or otherwise.

By way of non-limiting example, for each pixel of a predicted denoised image 115, the machine learning model(s) 110 may approximate a predictive distribution, use the expected value of the approximation as the value for the pixel in the denoised image 115, and use an uncertainty value such as deviation (e.g., standard or mean absolute) or variance of the approximation as the value in the uncertainty map 120. Thus, the machine learning model(s) 110 may use predicted uncertainty values to populate an uncertainty map 120 quantifying predictive uncertainty of the denoised image 115, with dimensions that correspond to the denoised image 115. In embodiments where the uncertainty map 120 has three channels, uncertainty may be predicted on a per pixel basis separately for each RGB channel (or a different number of channels for a different color format). In embodiments where the uncertainty map 120 has one channel, uncertainty may be predicted on a per pixel basis by averaging uncertainty values computed based on separate RGB predictions, based on averaged predictions for RGB values, or otherwise aggregating the data.

In some embodiments, the machine learning model(s) 110 may be implemented using a neural network, such as a convolutional neural network (CNN). Although certain embodiments are described with the machine learning model(s) 110 being implemented using a neural network(s), and specifically a CNN(s), this is not intended to be limiting. For example, and without limitation, the machine learning model(s) 110 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In some embodiments, the machine learning model(s) 110 may include, without limitation, a feature extractor including convolutional layers, pooling layers, and/or other layer types. Generally, the output of one layer may be passed as (one of the) input(s) to the next layer. The input layer of the machine learning model(s) 110 may accept an image or other suitable representation of a set of values per pixel, such as values for color (e.g., single channel, separate channels for Red Green Blue (RGB)), ray-traced sample values, hit distance, visibility, normals, texture, albedo, specularity, and/or others.

In some embodiments, if image width or height are not divisible by a power of 2, the image may be padded (e.g., with zeros) up to the next width or height that is divisible. In some embodiments, a space-to-depth layer may apply a transform that reduces image resolution (e.g., by a scalar such as 2) to improve training and inference speed. In some embodiments, the feature extractor may be implemented using encoder and decoder components with skip connections. Skip connection may be implemented, for example, by storing some of the layer outputs in buffers and using them as secondary input(s) for downstream layers. Example architectures may include an autoencoder such as the U-Net autoencoder used in NVIDIA's OptiX/IRAY denoiser, a Feature Pyramid Network, Generative Adversarial Network (GAN), and/or another type of neural network or machine learning model.

In some embodiments, the machine learning model(s) 110 may include a Bayesian Neural Network (BNN). Generally, a BNN may be similar to a standard NN, but network weights are assigned probability distributions rather than point estimates. Bayesian approaches may predict certainty of results in addition to predicting results themselves. For example, a BNN may generate a predictive distribution by predicting a mean of the predictive distribution as well as uncertainty such as variation or deviation of the predictive distribution. In some embodiments, a single BNN may include a common trunk (or stream of layers) with different heads (or at least partially discrete streams of layers) that predict the mean and the uncertainty. Generally, a BNN may be trained using variational inference to model these distributions, and the BNN may be evaluated using Maximum A Posteriori (MAP) estimates (e.g., of the mean) of the variational posterior distributions.

The machine learning model(s) 110 may be used in an iterative process that predicts successively higher quality denoised images until one or more completion criteria are met. Initially, the input image 105 may be accessed or generated. In some embodiments, the input image 105 may be rendered with uniformly distributed samples (e.g., one sample per pixel) across the image. In a first iteration of the loop illustrated in FIG. 1, the input image 105 may be fed into the machine learning model(s) 110, which may jointly predict a denoised image 115 and an uncertainty map 120. Generally, the uncertainty map 120 may be used to identify which pixels would likely benefit from one or more additional samples, so the uncertainty map 120 may be used to allocate additional samples to pixels with higher uncertainty, as explained in more detail herein.

In the embodiment illustrated in FIG. 1, after a feedforward pass through the machine learning model(s) 110, the control component 125 may evaluate one or more completion criteria to determine whether to pass through the uncertainty map 120 for an iteration of the loop or whether to stop the loop and use the denoised image 115 as the output image 160. Example completion criteria are explained in more detail herein. In this example configuration, when the control component 125 determines that the completion criteria are not met, the control component 125 may pass the uncertainty map 120 through to the sample distributor 135, decline to break the loop, otherwise allow the sample distributor 135 to access the uncertainty map 120, and/or otherwise allow the loop to continue to operate.

The sample distributor 135 may use the uncertainty map 120 to distribute additional samples per pixel, thereby indicating which pixels should be resampled and how many times. In some embodiments, rather than uniformly distributing additional samples, the sample distributor 135 may allocate additional samples to pixels with higher uncertainty, based on the uncertainty map 120. For example, given a particular sampling budget (e.g., 10 samples/pixel on average), the sample distributor 135 may distribute the sampling budget across eligible pixels to reduce uncertainty. For example, the sample distributor 135 may distribute the sampling budget (or a portion allocated to a particular loop iteration) into a sampling map 140, which may store or otherwise indicate a number of additional samples to render per pixel of the input image 105 and/or the rendered image 155. By way of non-limiting example, the sampling map 140 may comprise one or more data structures having one or more dimensions corresponding to pixel height and pixel width of the input image 105 and/or the rendered image 155 (e.g., a matrix with the same height and width as the rendered image 155).

The sample distributor 135 may distribute additional samples using any known distribution technique, such as variation or deviation reduction techniques. By way of non-limiting example, the sample distributor 135 may compute a sampling distribution per pixel as $\alpha s^2/n$, where $\alpha$ is a constant, $s$ is $e^\sigma$ (which may be taken or derived from the uncertainty map 120), and $n$ is the number of samples already taken for the pixel. The sample distributor 135 may scale and/or round the sampling distribution to allocate the sampling budget into a sampling map 140, for example, of integer values indicating a number of additional samples to render per pixel, such that the sum of the integer values is less than or equal to the sampling budget. As such, the sampling map 140 may be used to identify which pixels to sample, and how many times.

The sampling map 140 may be provided to the adaptive renderer 150 to render additional samples. For example, in a first loop iteration, the input image 105 may be used with the sampling map 140 to render the additional samples identified by the sampling map 140 and average the additional samples into the input image 105, thereby generating a rendered image 155. In subsequent loop iterations, the rendered image 155 from the previous loop iteration may be used with the sampling map 140 generated in the next loop iteration to render and average additional samples into the rendered image 155 from the previous loop iteration, thereby generating a less noisy rendered image 155. In any given iteration, the number of samples per pixel identified in the sampling map 140 may be read and rendered. The total number of rendered samples per pixel (and/or the sum of the values of the samples per pixel) may be tracked and updated, and the additionally rendered samples may be averaged into the image from the previous iteration. Thus, rather than rendering a uniform distribution of additional samples, the adaptive renderer 150 may render a distribution of additional samples that is a function of prediction uncertainty of the denoised image 115. As such, the present techniques may improve the efficiency with which samples are distributed to areas of an image that need refinement, resulting in faster convergence time, saving computational resources, and/or significantly accelerating the rendering process. The resulting rendered image 155 may be fed back into the machine learning model(s) 110, and the process may be repeated in a loop to render successively higher quality images.

Generally, the loop may be iterated, predicting successive higher quality images, until one or more completion criteria are satisfied. In some embodiments, one or more completion criteria may be evaluated by the control component 125, for example, after a feedforward pass through the machine learning model(s) 110, to determine whether to stop the loop and use the current denoised image 115 as the output image 160. Generally, any of a variety of completion criteria may be evaluated. In some embodiments, a time budget (e.g., 1 hr, 10 hrs, etc.) and/or sampling budget (1000 samples/pixel average) may be applied, and the control component 125 may allow the loop to run until the budget runs out (e.g., the control component 125 may only trigger the next loop iteration when there is sufficient time and/or sampling budget remaining or may immediately terminate the loop when the time or other budget runs out). Additionally or alternatively, the control component 125 may compare structural similarity between predicted denoised images 115 or adaptively rendered images 155 from successive loop iterations (e.g., using a neural network trained to predict structural similarity and/or an algorithm), and the control component 125 may break the loop off when structural similarity is above some threshold such as 99% (e.g., indicating another loop iteration may not predict substantially better image quality). In yet another example, the control component 125 may combine uncertainty values from the uncertainty map 120 to form some measure of composite uncertainty for a denoised image 115 (e.g., sum of squares of mean variation per pixel), compare the composite uncertainty with some threshold, and break the loop when the composite uncertainty for a denoised image 115 is below the threshold.

Additionally or alternatively, the control component 125 may break the loop at some other point besides after a feedforward pass through the machine learning model(s) 110. For example, in some embodiments, the control component 125 may break the loop based on a user input or other signal requesting to stop the loop. In some circumstances, the request may be received while one of the other components of the adaptive rendering and denoising system 100 is operating, in which case the control component 125 may interrupt the operation of the other component. In another example, the control component 125 may interrupt rendering (e.g., by the adaptive renderer 150) at some predetermined amount of time before a time budget expires. Running the machine learning model(s) 110 may consume a predictable amount of time (e.g., as processing any given image with a fixed height/width on a particular computer may take a predictable amount time). In some circumstances, the expected time $t_{NN}$ for a feedforward pass through the machine learning model(s) 110 may be less than the expected time for the adaptive renderer 150 to generate a rendered image 155. Assuming a time limit for the whole algorithm is T, the control component 125 may interrupt rendering (e.g., by the adaptive renderer 150) at time $T-t_{NN}$, in which case, the current version of the rendered image 155 at the time of the interrupt may be provided to the machine learning model(s) 110 in order to create a final denoised image 115 at (or around) time T.

As such, the control component 125 may evaluate one or more completion criteria to determine whether and when to stop the loop, and/or whether and when to use the denoised image 115 as the output image 160. When the completion criteria are not met, the control component 125 may pass the uncertainty map 120 through to the sample distributor 135, decline to break the loop, and/or otherwise allow the loop to continue to operate. Additionally or alternatively to interrupting the loop based on one or more completion criteria, in some embodiments, the control component 125 may inject a delay between successive loop iterations to avoid running the loop too frequently and/or consuming too many resources. The foregoing scenarios are just a few examples, and other variations may additionally or alternatively be applied. The output image 160 may be used as an output frame (e.g., rendered to a display) or additional processing may be performed on or using the output image 160 to generate the output frame.

Figure 2:
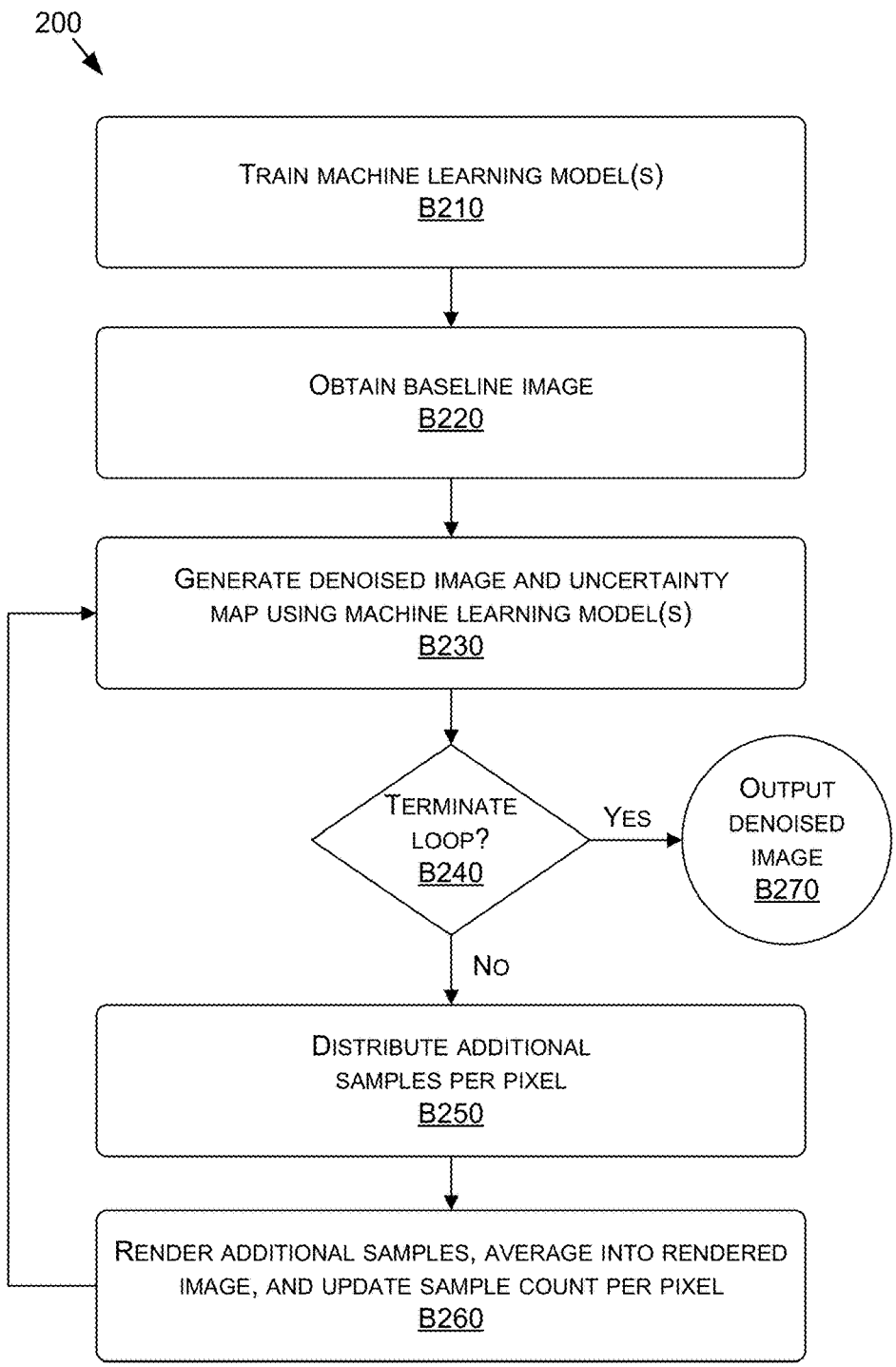
FIG. 2 is a flow diagram showing a method for adaptive rendering and denoising, in accordance with some embodiments of the present disclosure.

Now referring to FIG. 2, each block of method 200, described herein, comprises a computing process that may be performed using any combination of hardware, firmware, and/or software. For instance, various functions may be carried out by a processor executing instructions stored in memory. The method 200 may also be embodied as computer-usable instructions stored on computer storage media. The method 200 may be provided by a standalone application, a service or hosted service (standalone or in combination with another hosted service), or a plug-in to another product, to name a few. In addition, method 200 is described, by way of example, with respect to the adaptive rendering and denoising system 100 of FIG. 1. However, this method may additionally or alternatively be executed by any one system, or any combination of systems, including, but not limited to, those described herein.

FIG. 2 is a flow diagram showing a method 200 for adaptive rendering and denoising, in accordance with some embodiments of the present disclosure. The method 200, at block B210, includes training a machine learning model(s). For example, a machine learning model(s) such as the machine learning model(s) 110 of FIG. 1 may be implemented using a neural network, such as a convolutional neural network (CNN) and/or a Bayesian Neural Network (BNN), as described herein. The machine learning model(s) may be trained on any suitable training dataset. For example, the training dataset may include images with different quality, resolutions, and/or noise content. The training dataset may include pairs or series of images, with lower quality images used as inputs and corresponding higher quality images used as ground truth. In some embodiments, the machine learning model(s) may be updated after each feedforward pass using pairs of images from the training dataset. In other examples, a predicted denoised image may be fed back into the machine learning model(s) and used to predict a higher quality image any number of times to create a series of images with increasing quality, and the machine learning model(s) may be updated based on a corresponding series of images from the training dataset.

Generally the machine learning model(s) may be updated by minimizing a loss function computed using predicted values and ground truth images. The loss function used for training may include a term that depends on uncertainty, such as mean absolute deviation s, standard deviation $\sigma$, variance $\sigma^2$, log of mean absolute deviation, log of standard deviation, log variance, and/or the like. For example, in embodiments where the machine learning model(s) predicts a mean (i.e., the denoised image) and uncertainty (e.g., deviation or variance), training may serve to restore the mean by minimizing the loss function. For example, the loss function may include a regression loss term (e.g., mean square error, L1, etc.) that compares each predicted pixel to ground truth (taken as the mean) and compensates based on the predicted uncertainty for that pixel. For example, loss may be computed per pixel based on mean absolute deviation s using the following equation:

$$\frac{|x-\mu|}{s} + \log(s) \quad (1)$$

where x is the predicted denoised image, μ is ground truth, and s is mean absolute deviation (MAD). In another example, loss may be computed as an exponential of the loss in equation (1) multiplied by some selected positive constant value a:

$$e^{a\left(\frac{|x-\mu|}{s} + \log(s)\right)} \quad (2)$$

with higher a values resulting in a trained network that produces more crisp denoised images, and lower α values resulting in smoother denoised images. In yet another example, loss may be computed per pixel based on variance $\sigma^2$ using the following equation:

$$\frac{(x-\mu)^2}{2\sigma^2} + \log(\sigma) \quad (3)$$

The loss may computed per pixel and averaged (e.g., per channel, across all RBG channels). For a series of predictions, the loss may be determined for each iteration and averaged. Minimizing a loss function based on uncertainty such as deviation or variation may result in a model that produces better numerical stability.

A loss function that includes one or more uncertainty terms may be constructed as follows. An uncertainty term, such as s or σ in the equations (1), (2), and (3) may be treated as a free parameter (per pixel), while other parameters, such as x in the equations (1), (2), and (3) may be treated as a random variable. The random variable may naturally represent the result of a neural network output prediction (e.g., a pixel value) based on a particular input image (e.g., a rendering of a specific scene using random sampling). In this sense, the loss function itself may be treated as a random variable with respect to the input image (e.g., the rendered image) and the free parameter (e.g., s or a). Here, finding loss minimum on average may be interpreted to mean finding the minimum of its estimate. Thus, a loss function may be constructed or chosen in such a way that its minimum is reached when the uncertainty term (e.g., s or a) is equal to a desired statistical metric of the random variable (e.g., x), such as variance, standard deviation, or mean absolute deviation (MAD) of prediction uncertainty. By way of nonlimiting example, an estimation of the loss function in equation (1) may be computed as:

$$E\left(\frac{|x-\mu|}{s} + \log(s)\right) = \log(s) + \frac{1}{s}E(|x-\mu|) \quad (4)$$

In this case, the minimum of the estimation (3) with respect to s as a free parameter may be achieved for s=E(|x−μ|), i.e., the mean of absolute deviation of x. Training a neural network such as the machine learning model(s) 110 of FIG. 1 by minimizing this loss function may produce a model that learns to predict mean average deviation in an uncertainty channel.

The method 200, at block B220, includes obtaining a baseline image. In some embodiments, the baseline image may be rendered (e.g., by the adaptive renderer 150 or a different renderer) with uniformly distributed samples (e.g., one sample per pixel) across the image. However, as a general matter, any image may be used as a baseline image, and the baseline image may be obtained in any way (e.g., selected, identified, uploaded, downloaded, generated some other way, and/or the like).

The method 200 includes operating blocks B230-B260 on a loop until some loop completion criterion is satisfied. The method 200, at block B230, includes generating a denoised image and an uncertainty map using the machine learning model(s). For example, in a first loop iteration, the machine learning model(s) 110 of FIG. 1 may jointly generate the denoised image 115 and the uncertainty map 120 using the baseline image obtained at block B220 as the input image 105 of FIG. 1. In subsequent loop iterations, the machine learning model(s) 110 of FIG. 1 may jointly generate the denoised image 115 and the uncertainty map 120 from an updated rendered image generated at block B260 (e.g., the rendered image 155 of FIG. 1), described in more detail herein.

The method 200, at block B240, includes determining whether to terminate the loop. For example, the control component 125 of FIG. 1 may evaluate one or more completion criteria to determine whether and when to terminate the loop. If a determination is made to terminate the loop at block B240, the denoised image generated at block B230 is output at block B270. Otherwise, the loop continues on to block B250. Generally, any of a variety of completion criteria may be evaluated to determine whether to terminate the loop. Examples of satisfied completion criteria may include a determination that a denoised image generated at block B230 has converged to a designated quality, a determination that a time or sampling budget has expired (or is expected to expire), and/or others. Although B240 is shown after block B230 in FIG. 2, in various embodiments block B240 may be performed elsewhere in the loop and/or at least partially in parallel with one or more blocks of the loop.

The method 200, at block B250, includes distributing additional samples per pixel. For example, the sample distributor 135 of FIG. 1 may use the uncertainty map 120 to distribute additional samples per pixel, thereby indicating which pixels should be resampled and how many times. In some embodiments, rather than uniformly distributing additional samples the additional samples may be allocated corresponding to pixels of the denoised image 115 with higher prediction uncertainty, based on the uncertainty map 120 generated at block B230. Thus, a sampling budget (or portion thereof, e.g., a portion allocated to a particular loop iteration) may be distributed to reduce uncertainty of the denoised image. Any known distribution technique may be used, such as variation or deviation reduction techniques. In some embodiments, the distribution of additional samples may be represented in a sampling map storing an integer value for each pixel, indicating the number of additional samples to render for each pixel.

The method 200, at block B260, includes rendering the additional samples, averaging the additional samples into the rendered image from the previous iteration (or the baseline image for the first iteration), and updating a sample count per pixel. For example, the adaptive renderer 150 of FIG. 1 may identify the number of additional samples to render for each pixel from a sampling map, render the additional samples per pixel, and average them into the rendered image 155 from the previous iteration to generate an updated version of the rendered image (e.g., the rendered image 155 of FIG. 1). In some embodiments, a count of the total number of rendered samples per pixel (and/or the sum of the values of the samples per pixel) may be tracked. As such, the tracked count (and/or sum) may be updated in each loop iteration to reflect the number of samples (and/or the sum of the values of the samples) per pixel in the updated rendered image. In some embodiments, this count may be fed into the machine learning model(s) 110 with the rendered image 155 and used to generate the denoised image 115.

Figure 3:
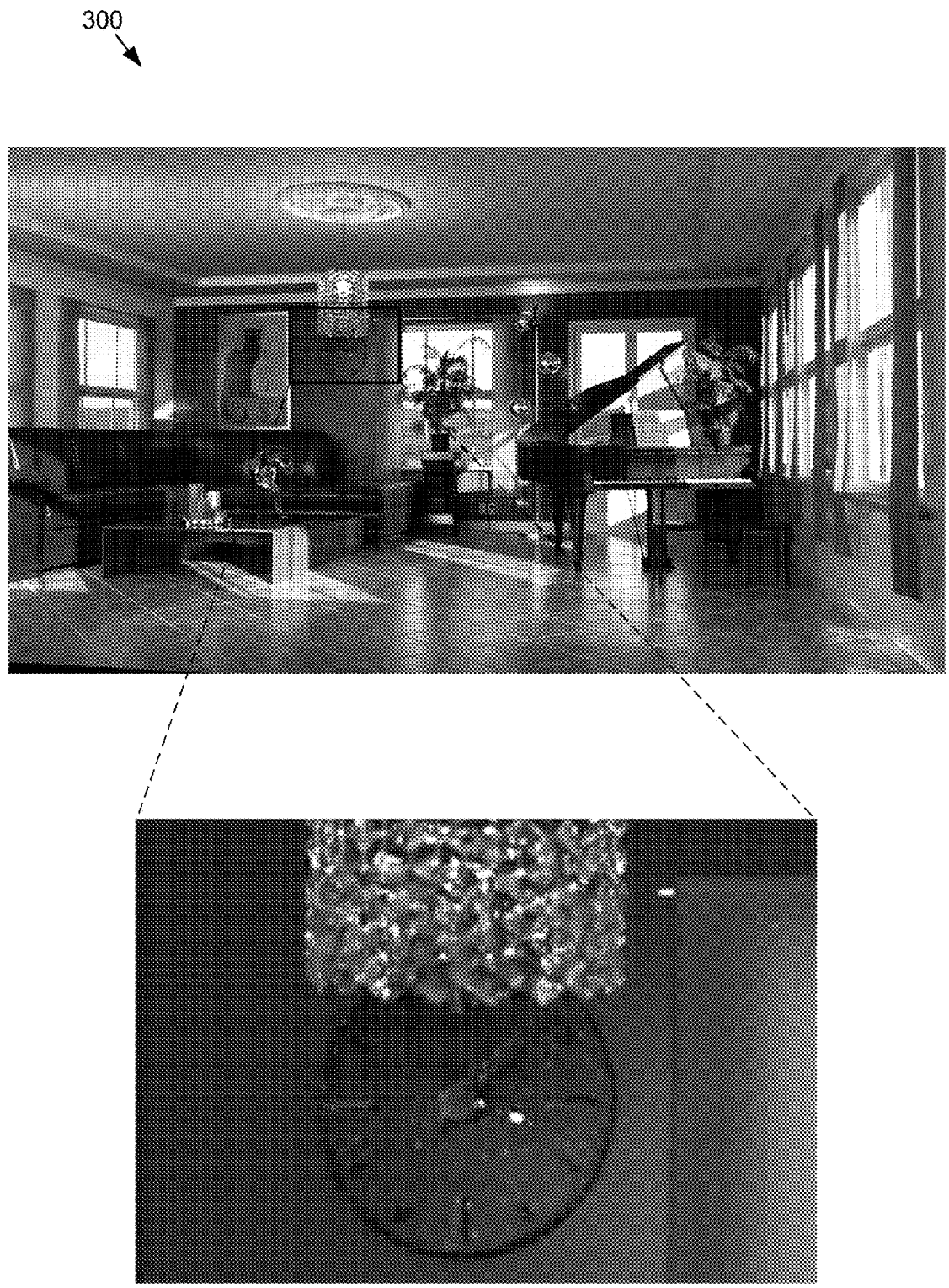
FIG. 3 is an example image rendered using a prior technique.
Figure 4:
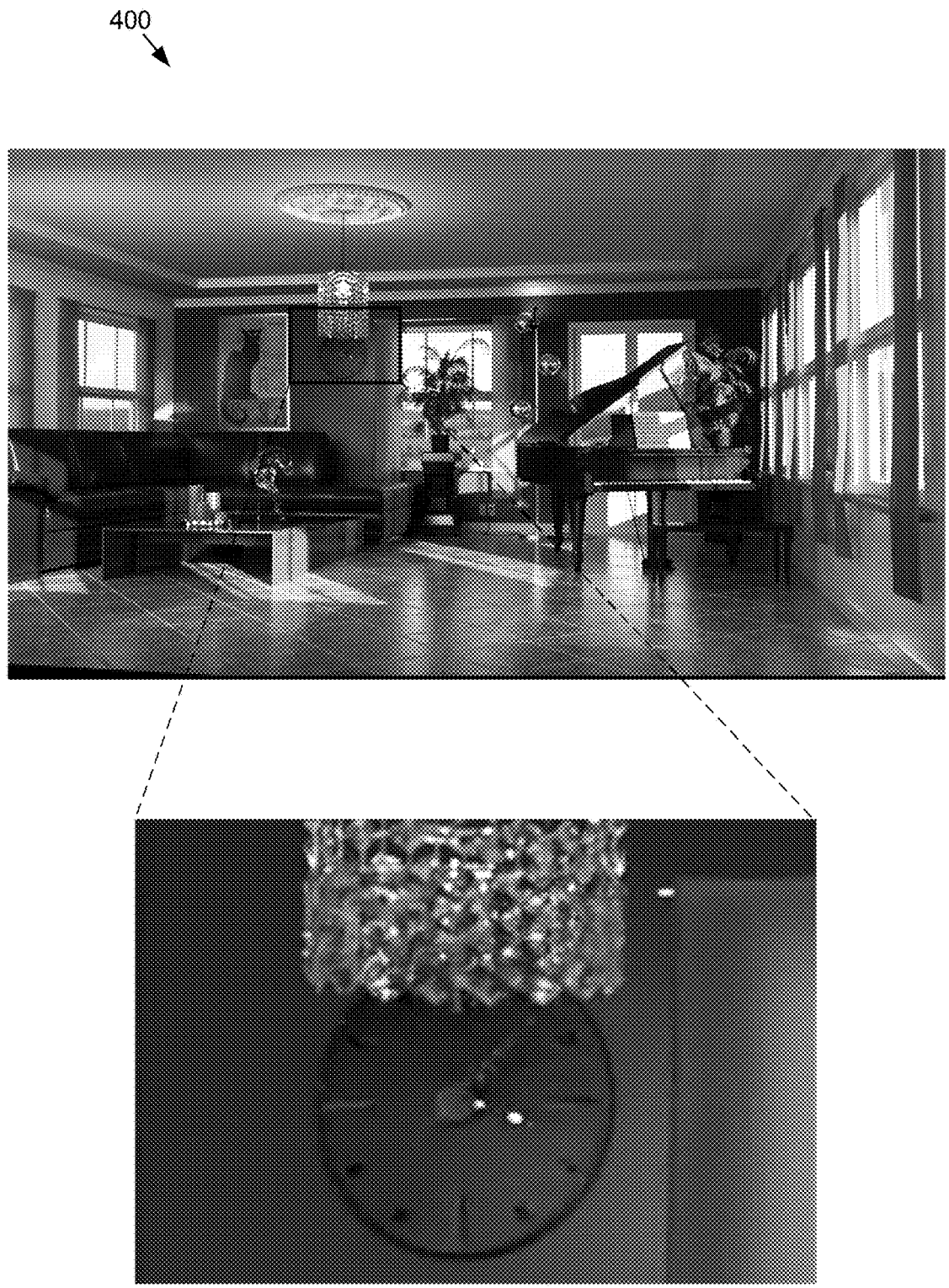
FIG. 4 is an example image rendered in accordance with some embodiments of the present disclosure.

Turning now to FIGS. 3-4, these figures illustrate a comparison between an example image rendered using a prior technique (FIG. 3) and an example image rendered in accordance with some embodiments of the present disclosure (FIG. 4). Both of these images have been rendered using ray-traced samples from a complex scene with multiple light sources (e.g., windows, interior lighting) using an unlimited number of light reflections, reflective surfaces (e.g., glossy floor), and fine geometric detail.

FIG. 3 illustrates a prior technique in which an image is rendered with 512 samples per pixel and has been denoised. A magnified region of the image illustrates a problematic area with noise around the lamp and wall clock. FIG. 4 illustrates an image of the same scene generated using adaptive rendering and denoising techniques described herein. The image of FIG. 4 was rendered with 256 samples per pixel on average, half the samples used for the image of FIG. 3, and yet the magnified region of FIG. 4 illustrates substantially reduced noise around the lamp and wall clock. Thus, the present techniques produced a higher quality output using fewer ray-traced samples, thereby resulting in faster convergence time, saving computational resources, and/or significantly accelerating the rendering process. These benefits may be understood as resulting from a more efficient distribution of samples to areas of an image that need refinement.

Figure 5:
FIG. 5 is an example heat map illustrating the number of samples taken in the example image of FIG. 4, in accordance with some embodiments of the present disclosure.

Now referring to FIG. 5, FIG. 5 is heat map illustrating the distribution of ray-traced samples (e.g., the number of samples taken per pixel) in the example image of FIG. 4. Recall that with adaptive sampling, the distribution of samples is not uniform. In the heat map, the lighter shading indicates pixels that received more samples than the average. The white region surrounding the lamp and wall clock indicate relatively more samples were allocated to these pixels, resulting in a reduction of noise for these pixels, where the additional samples were beneficial.

Figure 6:
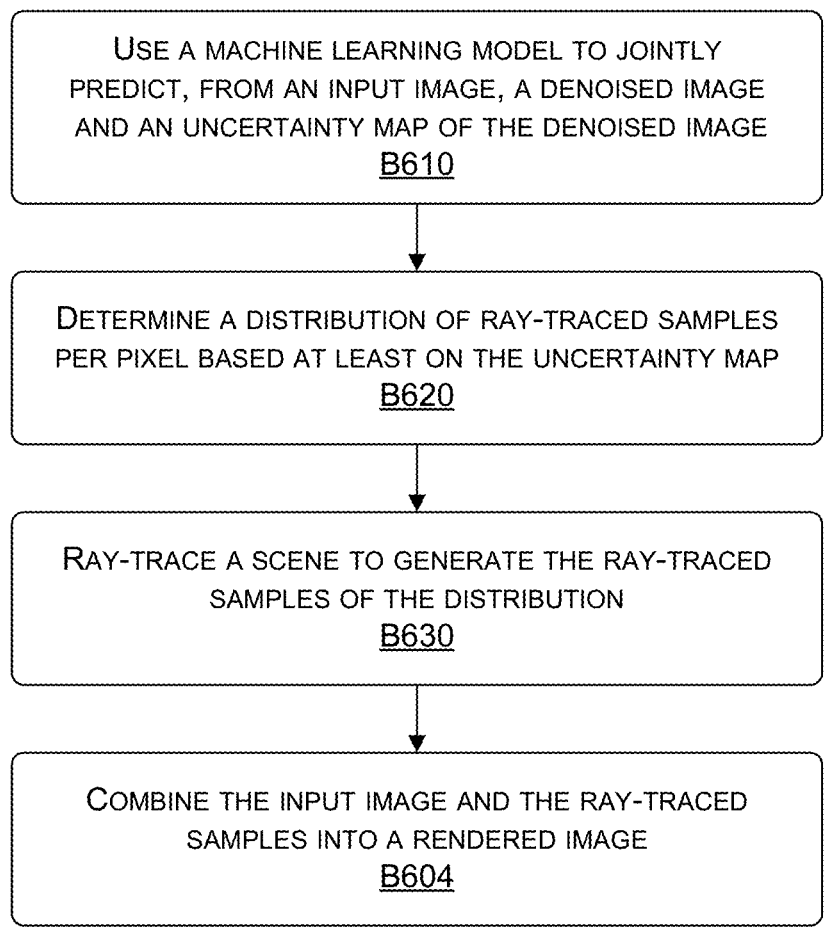
FIG. 6 is a flow diagram showing a method for adaptive rendering and denoising based on denoised image uncertainty, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, the method 600 is described, by way of example, with respect to the adaptive rendering and denoising system 100 of FIG. 1. However, this method may additionally or alternatively be executed by any one system, or any combination of systems, including, but not limited to, those described herein.

FIG. 6 is a flow diagram showing a method 600 for adaptive rendering based on denoised image uncertainty, in accordance with some embodiments of the present disclosure. The method 600, at block B610, includes using a machine learning model to jointly predict, from an input image, a denoised image and an uncertainty map of the denoised image. For example, in a first loop iteration, the machine learning model(s) 110 of FIG. 1 may jointly generate the denoised image 115 and the uncertainty map 120 using the input image 105 of FIG. 1. In subsequent loop iterations, the machine learning model(s) 110 of FIG. 1 may jointly generate the denoised image 115 and the uncertainty map 120 from the rendered image 155.

The method 600, at block B620, includes determining a distribution of ray-traced samples per pixel based at least on the uncertainty map. For example, the sample distributor 135 of FIG. 1 may use the uncertainty map 120 to distribute additional samples per pixel into the sampling map 140, thereby indicating which pixels should be resampled and how many times. Any known distribution technique may be used, such as variation or deviation reduction techniques.

The method 600, at block B630, includes ray-tracing a scene to generate the ray-traced samples of the distribution. For example, the adaptive renderer 150 of FIG. 1 may identify the number of additional samples to render for each pixel from the sampling map, and may render the additional samples by casting rays in a virtual representation of the scene to sample lighting conditions for pixels.

The method 600, at block B640, includes combining the input image and the ray-traced samples into a rendered image. For example, the adaptive renderer 150 of FIG. 1 may average the additional ray-traced samples into the input image to generate the rendered image.

Figure 7:
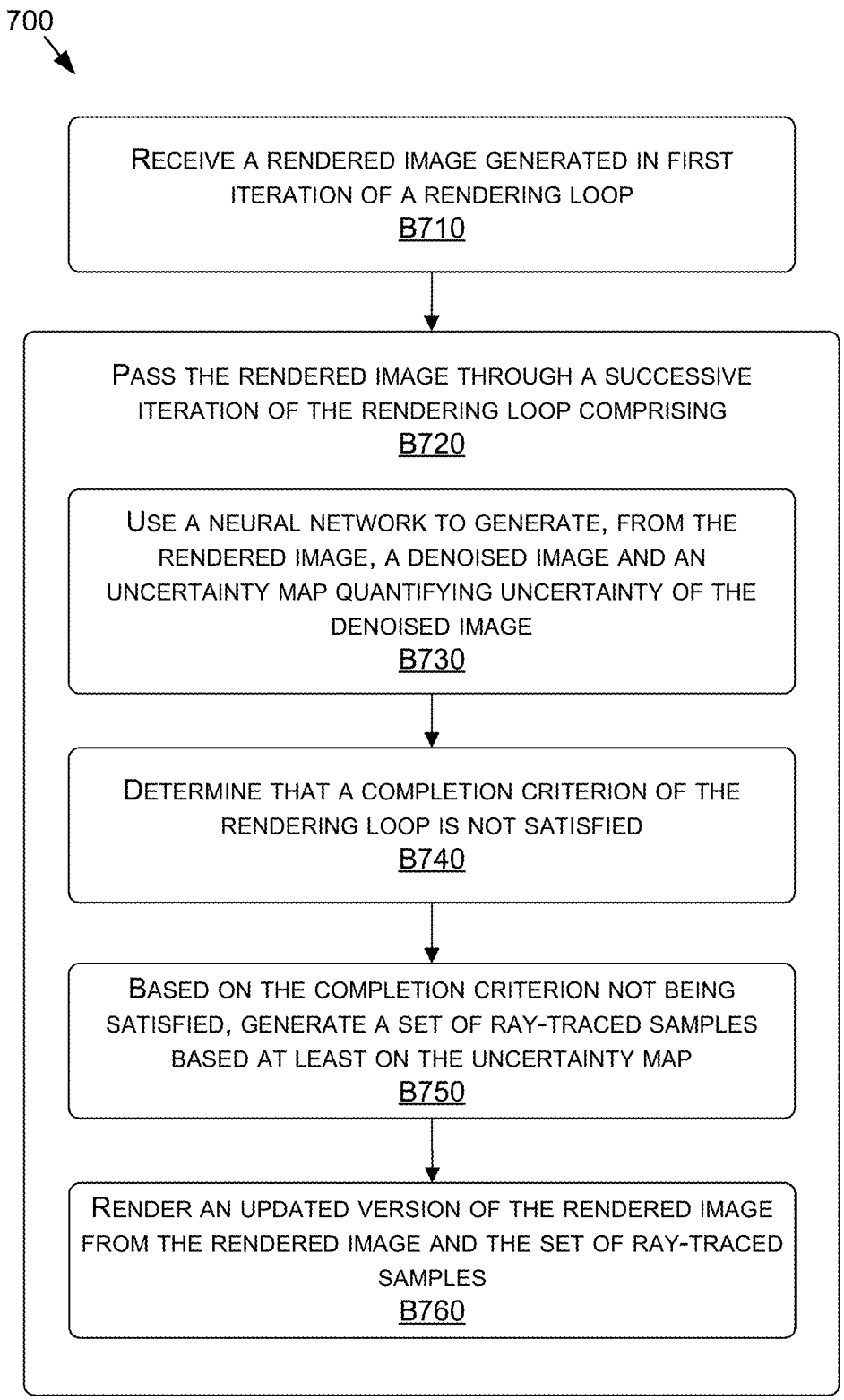
FIG. 7 is a flow diagram showing a method for adaptive rendering and denoising based on a rendering loop with a completion criterion, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The method 700 may also be embodied as computer-usable instructions stored on computer storage media. The method 700 may be provided by a standalone application, a service or hosted service (standalone or in combination with another hosted service), or a plug-in to another product, to name a few. In addition, the method 700 is described, by way of example, with respect to the adaptive rendering and denoising system 100 of FIG. 1. However, this method may additionally or alternatively be executed by any one system, or any combination of systems, including, but not limited to, those described herein.

FIG. 7 is a flow diagram showing a method 700 for adaptive rendering and denoising based on a rendering loop with a completion criterion, in accordance with some embodiments of the present disclosure. The method 700, at block B710, includes receiving a rendered image generated in first iteration of a rendering loop. For example, the components of the adaptive rendering and denoising system 100 of FIG. 1 may be operated in a loop to generate the rendered image 155.

The method 700, at block B720, includes passing the rendered image through a successive iteration of the rendering loop. In the embodiment illustrated by method 700, the successive iteration of the rendering loop includes the operations performed in blocks B730-B760. More specifically, the method 700, at block B730, includes using a neural network to generate, from the rendered image, a denoised image and an uncertainty map quantifying uncertainty of the denoised image. For example, the machine learning model(s) 110 of FIG. 1 may jointly generate the denoised image 115 and the uncertainty map 120 using the rendered image 155.

The method 700, at block B740, includes determining that a completion criterion of the rendering loop is not satisfied. For example, the control component 125 of FIG. 1 may evaluate one or more completion criteria and make a determination that the denoised image generated at block B730 has not converged to a designated quality, a determination that a time or sampling budget has not expired (or is expected to expire), and/or others.

The method 700, at block B750, includes, based on the completion criterion not being satisfied, generating a set of ray-traced samples based at least on the uncertainty map. For example, based on the control component 125 of FIG. 1 determining that the completion criterion is not satisfied in block B740, the control component 125 of FIG. 1 may pass the uncertainty map 120 to the sample distributor 135, the sample distributor 135 may generate the sampling map 140, and the adaptive renderer 150 may render the additional ray-traced samples identified by the sampling map 140.

The method 700, at block B760, includes rendering an updated version of the rendered image from the rendered image and the set of ray-traced samples. For example, the adaptive renderer 150 of FIG. 1 may average the set of ray-traced samples into the rendered image to generate the updated version of the rendered image.

Example Computing Device

Figure 8:
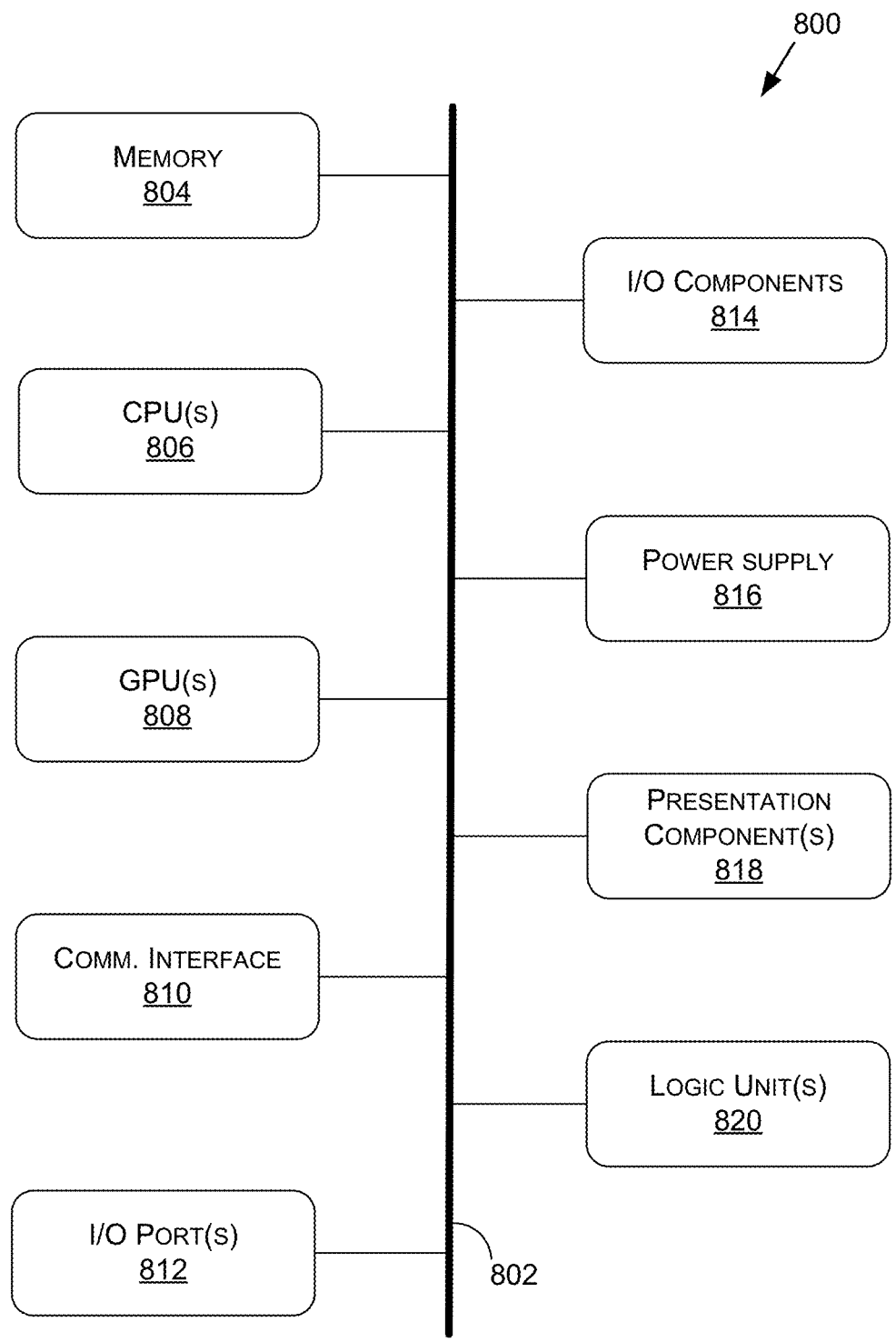
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    using a machine learning model to generate, from an input image, a predictive distribution of color values of one or more pixels of a denoised image;
    determining to render one or more ray-traced samples based at least on uncertainty of the predictive distribution; and
    combining the input image and the one or more ray-traced samples into a rendered image.

2. The method of claim 1, wherein the machine learning model is configured to generate the predictive distribution based at least on predicting a mean of the predictive distribution and an uncertainty value representing the uncertainty of the predictive distribution.

3. The method of claim 1, wherein the machine learning model is configured to store at least one of: an expected value of the predictive distribution in the denoised image, or an uncertainty value representing the uncertainty of the predictive distribution in an uncertainty map that quantifies prediction uncertainty of the denoised image.

4. The method of claim 1, wherein the machine learning model is a Bayesian neural network configured to jointly predict the denoised image and an uncertainty map that quantifies prediction uncertainty of the denoised image.

5. The method of claim 1, wherein the machine learning model is configured to predict an uncertainty map comprising one or more channels that represent at least one of: deviation, variance, logarithm of deviation, or logarithm of variance of the predictive distribution.

6. The method of claim 1, wherein the determining to render the one or more ray-traced samples comprises generating a sampling distribution based at least on the uncertainty and a number of previously taken samples, and allocating a sampling budget based at least on the sampling distribution.

7. The method of claim 1, further comprising tracking a number of rendered samples per pixel, wherein the combining of the input image and the one or more ray-traced samples comprises averaging the one or more ray-traced samples into the input image using the number of rendered samples per pixel.

8. The method of claim 1, further comprising feeding the rendered image for a subsequent pass through the machine learning model.

9. The method of claim 1, further comprising operating the machine learning model in an adaptive rendering loop configured to render images with successively higher ray-traced sample counts in successive iterations until a completion criterion is satisfied.

10. The method of claim 1, further comprising operating the machine learning model in an adaptive rendering loop configured to render images with successively higher ray-traced sample counts in successive iterations until a completion criterion is satisfied, wherein the completion criterion comprises at least one of an expiration of a time budget, an expiration of a sampling budget, a structural similarity between the denoised image and a subsequent denoised image generated by the machine learning model in a subsequent iteration of the adaptive rendering loop being above a first threshold, or a composite uncertainty for the subsequent denoised image being below a second threshold.

11. The method of claim 1, wherein the method is performed by at least one of:
    a computer graphics system;
    an animation system;
    an augmented or virtual reality system;
    a movie production system; or
    an architecture, engineering, or lighting design system.

12. A processor comprising:
    one or more circuits to:
        feed an input image into a machine learning model that generates data indicating a predictive distribution of color values of a pixel of a denoised image;
        render one or more ray-traced samples for one or more pixels identified based at least on uncertainty of the predictive distribution; and
        generate a rendered image based at least on a combination of the input image with the one or more ray-traced samples.

13. The processor of claim 12, wherein the machine learning model is configured to generate the data indicating the predictive distribution based at least on predicting a mean of the predictive distribution and an uncertainty value representing the uncertainty of the predictive distribution.

14. The processor of claim 12, wherein the machine learning model is configured to store at least one of: an expected value of the predictive distribution as a color value of the pixel in the denoised image, or an uncertainty value representing the uncertainty of the predictive distribution in a corresponding pixel of an uncertainty map that quantifies prediction uncertainty of the denoised image.

15. The processor of claim 12, the one or more circuits further to determine to render the one or more ray-traced samples based at least on:
    generating a sampling distribution based at least on the uncertainty and a number of previously taken samples; and
    allocating a sampling budget based at least on the sampling distribution.

16. The processor of claim 12, the one or more circuits further to track a number of rendered samples per pixel and generate the rendered image based at least on averaging the one or more ray-traced samples into the input image using the number of rendered samples per pixel.

17. The processor of claim 12, wherein the processor is comprised in at least one of:
- a computer graphics system;
- an animation system;
- an augmented or virtual reality system;
- a movie production system; or
- an architecture, engineering, or lighting design system.

18. A system comprising:
- one or more processing units; and
- one or more memory units storing instructions that, when executed by the one or more processing units, cause the one or more processing units to execute operations comprising:
  - generating a rendered image corresponding to a combination of an input image and one or more ray-traced samples that are based at least on uncertainty in a distribution of color values associated with a denoised image, the distribution of color values predicted from the input image using a machine learning model.

19. The system of claim 18, wherein the machine learning model is configured to generate the distribution based at least on predicting a mean of the predictive distribution and an uncertainty value representing the uncertainty in the distribution.

20. The system of claim 18, wherein the machine learning model is configured to store at least one of: an expected value of the distribution in the denoised image, or an uncertainty value representing the uncertainty in the distribution in an uncertainty map that quantifies prediction uncertainty of the denoised image.

21. The system of claim 18, wherein the machine learning model is configured to predict an uncertainty map comprising one or more channels that estimate at least one of: deviation, variance, logarithm of deviation, or logarithm of variance of distributions of corresponding pixels of the denoised image.

22. The system of claim 18, the operations further comprising determining to render the one or more ray-traced samples based at least on the uncertainty.

23. The system of claim 18, wherein the system is comprised in at least one of:
- a computer graphics system;
- an animation system;
- an augmented or virtual reality system;
- a movie production system; or
- an architecture, engineering, or lighting design system.

* * * * *